US012700278B2

(12) United States Patent (10) Patent No.: US 12,700,278 B2
Jamieson et al. (45) Date of Patent: Aug. 4, 2026

(54) TERMINAL SELF-CONFIGURATION OF MEDIA CASSETTES

(71) Applicant: NCR Atleos Corporation, Atlanta, GA (US)

(72) Inventors: Daniel James Jamieson, Atlanta, GA (US); Michael Jonathon McKaig, Atlanta, GA (US)

(73) Assignee: NCR Atleos Corporation, Atlanta, GA (US)

( * ) Notice: Subject to any disclaimer, the term of this patent is extended or adjusted under 35 U.S.C. 154(b) by 670 days.

(21) Appl. No.: 18/129,190

(22) Filed: Mar. 31, 2023

(65) Prior Publication Data

US 2024/0331484 A1 Oct. 3, 2024

(51) Int. Cl.
*G07D 11/25* (2019.01)
*G06Q 40/02* (2023.01)
*G07D 11/13* (2019.01)
*G07D 11/34* (2019.01)
*G07D 11/50* (2019.01)

(52) U.S. Cl.
CPC ............. *G07D 11/25* (2019.01); *G06Q 40/02* (2013.01); *G07D 11/13* (2019.01); *G07D 11/34* (2019.01); *G07D 11/50* (2019.01); *G07D 2207/00* (2013.01); *G07D 2211/00* (2013.01)

(58) Field of Classification Search
CPC ........ G07D 11/75; G07D 11/13; G07D 11/34; G07D 11/50; G07D 11/23; G06Q 40/02
See application file for complete search history.

(56) References Cited

U.S. PATENT DOCUMENTS

| | | | |
|---|---|---|---|
| 7,708,275 B2 * | 5/2010 | Aoki | G07D 11/25 |
| | | | 271/298 |
| 8,600,842 B1 * | 12/2013 | Sanders | G07F 19/209 |
| | | | 705/16 |
| 8,812,394 B1 * | 8/2014 | Folk | G07D 11/24 |
| | | | 235/379 |
| 11,263,857 B1 * | 3/2022 | Miller | G07D 11/34 |
| 11,315,379 B1 | 4/2022 | Crandall et al. | |
| 11,315,397 B2 * | 4/2022 | Bella | G08B 13/2417 |
| 11,900,753 B1 * | 2/2024 | Mande | G07F 19/205 |
| 2013/0199888 A1 * | 8/2013 | Hoeschen | G07D 11/34 |
| | | | 194/206 |
| 2025/0190900 A1 * | 6/2025 | Mande | G06Q 10/06311 |

FOREIGN PATENT DOCUMENTS

CA 3187338 2/2022

* cited by examiner

*Primary Examiner* — Patrick H Mackey
(74) *Attorney, Agent, or Firm* — Schwegman Lundberg & Woessner, P.A.

(57) ABSTRACT

A determination is made that notes in a recycler of a terminal are to be redistributed amongst the cassettes and a determination is made that a target cassette is to be redesignated for storing notes of a new denomination, which is different from a current denomination of notes stored in the target cassette. The terminal controls the recycler of the terminal to move the current denomination of notes out of the target cassette and store the current denomination of notes in a different cassette. When the target cassette is empty of notes, note counters for the cassettes are updated based on redistribution of the current denomination of notes and the target cassette is labeled as now being associated with the new denomination.

20 Claims, 4 Drawing Sheets

100B

100C

TERMINAL SELF-CONFIGURATION OF MEDIA CASSETTES

BACKGROUND

Currently, to obtain a proper balance of currency denominations held in cassettes of media terminals, such as automated teller machines (ATMS), manual service visits to the ATM are required by cash service personnel or retail staff. These physical interventions require scheduling and planning by the ATM operators and bring the ATMs offline and unavailable for customer transactions, which is costly to the operators.

Recyclers were supposed to alleviate the frequency of cash service visits. However, each ATM is associated with different customers from different geographical areas and/or cultures. That is, each ATM has its own media profile associated with cash deposits and withdrawals of the customers at the corresponding ATM. Each ATM also has a maintained configuration for denominations recycled by its recycler. ATM operators often settle on the ATM's denomination configuration when a recycler is first installed within their ATM and never change the denominations thereafter. The problem with this is that customer demographics, economic conditions, and cash behaviors are dynamic and change over time. Thus, the recycler begins to experience more frequent media service visits over time as the media profile changes.

Continually adjusting the ATM's denomination configuration is also problematic because the ATM operators experience costs associated with cash service visits and the ATMs are offline for a substantial period of time during cash reconfiguration at the ATMs. The ATM operators or retail staff see no need to schedule a cash service visit when the recycler itself is not reporting that it has excess denominations or is short denominations. From the point of view of the operators currently, continually readjusting the recyclers recyclers denominations is just adding more cash service visits needed by the ATM.

SUMMARY

In various embodiments, a system, a terminal, and a method for terminal self-configuration of media cassettes are presented. A determination is made that a target cassette in a recycler has too few notes of a current denomination or that a target cassette is to be changed from a first denomination of notes currently stored in the target cassette to a second denomination of notes. A command is received by the terminal to change the current denomination of notes stored in the target cassette to a different denomination. The terminal controls the recycler of the terminal to move the current denomination of notes out of the target cassette and to store the current denomination of notes in one or more different cassettes. When the target cassette is empty of notes, note counters for the cassettes are updated based on redistribution of the current denomination of notes out of the target cassette and the target cassette is labeled as now being associated with the second denomination of notes.

In an embodiment, the terminal receives a command that initiates the operations on the recycler for the target cassette. The command is automatically generated on the terminal based on a current state of the recycler's cassettes, the command is received through an administrative interface of the terminal, and/or the command is received from a remotely connected server.

DETAILED DESCRIPTION

The only mechanism available in the industry by which currency denominations of a recycler can be changed/reconfigured at a media terminal is manual cash service visits. Manual cash service permits excess currency to be removed from any full cassette, permits new currency to be replenished in the appropriate denominations within the cassettes, and/or permits currency denominations for currency cassettes to redesignated to reconfigured to store desired denominations. Generally, unless a cassette being changed is completely empty, technology within the industry is not capable of having the terminal itself perform any of these media activities on its own and independently of a cash service visit.

Terminal operators are reluctant to continuously change the media profile of their recyclers because often the recyclers are not reporting a needed media service event and media service is costly to the operators. Additionally, media profiles and associated recommended recycled denomination configurations dynamically change over time such that if a denomination configuration is changed during a scheduled media visit, the media profile can subsequently change and require the recycler to have an unscheduled media service visit. Media profiles can change faster than recommended denomination configuration changes for a given terminal. Thus, most operators rely and stick to the original denomination configurations recommended for their terminals, which results in more frequent that would be necessary media service activities.

These problems are resolved with the teachings provided herein and below. A terminal is provided an administrative function that permits the terminal to self-configure the denominations held in the cassettes of the terminal's recycler. That is, the denominations of notes held in the recycler cassettes are redistributed between the cassettes to achieve a current optimal distribution of the denomination of notes within the cassettes. This function, executed by the terminal, is initiated through an administrative interface of the terminal and/or through a remote command send from a server service to the terminal. Cassette metrics that identify the denominations within each cassette and the total number of notes within each cassette are updated when the function completes. At least one cassette is relabeled as being associated with a new denomination of notes from an original denomination stored in the cassette after the function is executed.

Figure 1A:
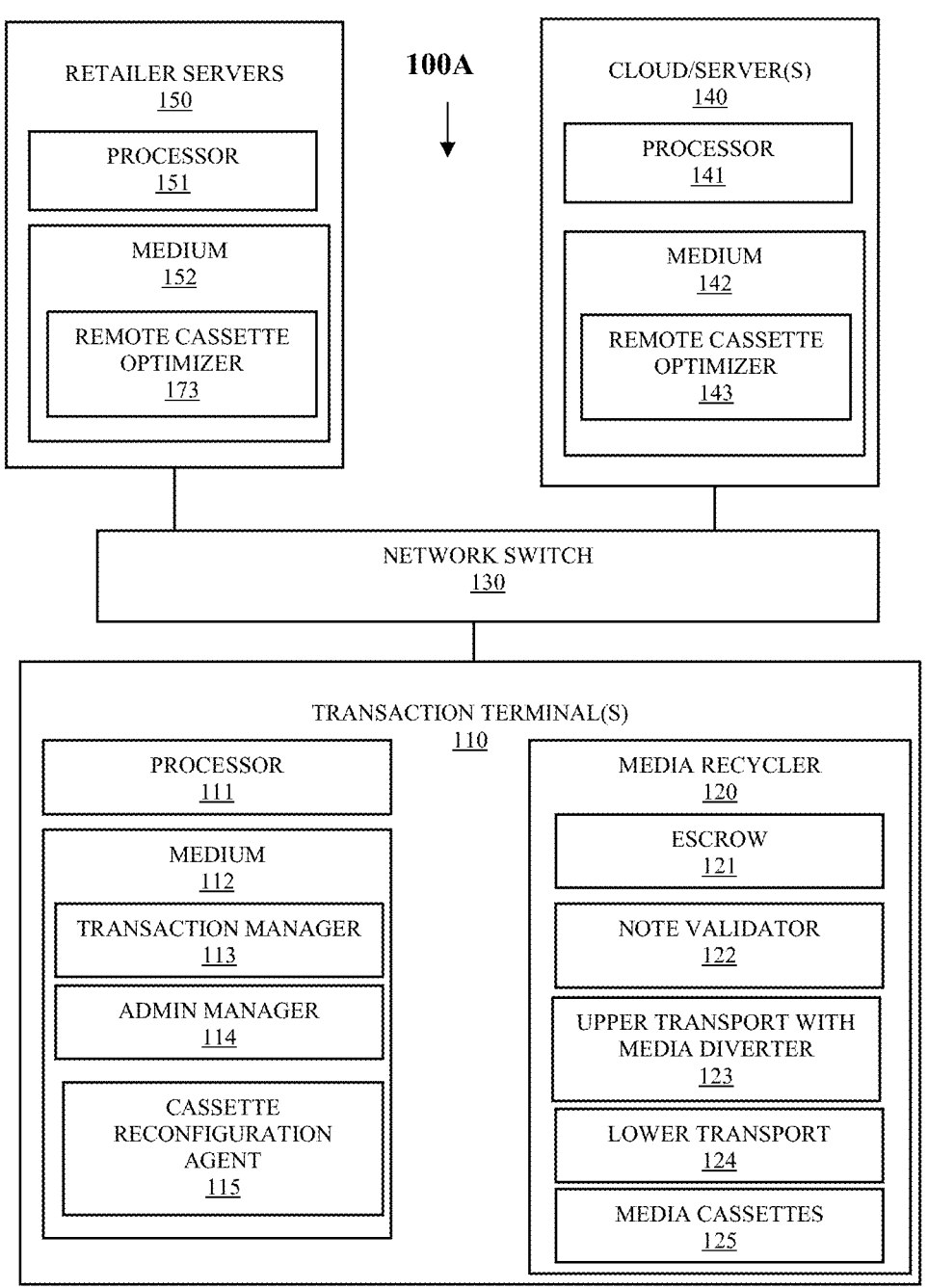
FIG. 1A is a diagram of a system including a terminal for terminal self-configuration of media cassettes, according to an example embodiment.

FIG. 1A is a diagram of a system 100A for terminal self-configuration of media cassettes according to an example embodiment. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is to be noted that other arrangements with more or less components are possible without departing from the teachings of terminal self-configuration of media cassettes presented herein and below.

System 100A includes one or more transaction terminals (hereinafter "terminals") 110, a network switch 130, a cloud 140 or a server 140 (hereinafter "cloud 140"), and optionally a plurality of retailer servers 150. Each terminal 110 includes a processor 111 and a non-transitory computer-readable storage medium (hereafter "medium") 112, which includes executable instructions for a transaction manager 113, and admin manager 114, and a cassette reconfiguration agent 115. Processor 111 obtains or is provided the executable instructions from medium 112 causing processor 111 to perform operations discussed herein and below with respect to 113-115. Each terminal 110 further includes a media recycler 120, an escrow module 121, a note validator module 122, an upper transport with media diverter module 123, a lower transport module 124, and media cassettes 125.

The network switch 130 permits transaction manager 113 or admin manager 114 to communicate over a secure connection with retailer servers 150 and/or cloud 140. This is for transactions being processed by transaction manager 113 on terminal 110 and/or is administrative operations being processed by admin manager 114 by operators or support personnel associated with managing and servicing the terminal 110. In an embodiment, the support personnel are associated with a given operator and managed from the operator's retailer server 150. In an embodiment, the support personnel are associated with a given third-party entity via cloud 140; the third-party entity manages a plurality of disparate terminals 110 on behalf of multiple retailers.

Cloud 140 includes at least one processor 141 and medium 142, which includes executable instructions for a remote cassette optimizer 143. Processor 141 obtains or is provided the executable instructions from medium 142 causing processor 141 to perform operations discussed herein and below with respect to 143.

Optionally, system 100A includes certain retailer servers 150. Each certain retailer servers 150 include a processor 151 and medium 152, which includes executable instructions for a remote cassette optimizer 153. Processor 151 obtains or is provided the executable instructions from medium 152 causing processor 151 to perform operations discussed herein and below with respect to 153.

Media recycler 120 includes an escrow module, which temporarily stores notes being processed through the recycler as a transaction is processed. Upper transport with media diverter module 123 transports note either into the lower transport module 125 for notes being deposited or out through a media dispenser/deposit module for notes being withdrawn from the recycler 120. Lower transport module 124 transfers notes received from the upper transport with media diverter module 123 into the corresponding cassettes 125 based on the note validator module 122. Lower transport module 124 also transfers notes out of corresponding cassettes 125 to upper transport with media diverter module 123 when the notes are to be dispensed through the media dispenser/deposit module. Note validator module 122 provides an indication as to a given note's denomination, as to whether the given note is fit for circulation or not (e.g., torn, dirty, ripped, or damaged notes are indicated as being unfit for circulation), as to whether the given note is counterfeit or genuine, and as to the denomination associated with the given note. The indication provided by the note validator module is used by the lower transport module 124 to determine which cassette 125 a given deposited note is to be stored.

Typically, transaction manager 113 controls the electromechanical modules 121-125 of the recycler 120 during currency deposits and withdrawals. For example, when $100 is to be dispensed to a consumer for a given transaction, manager 113 instructs the lower transport module 124 to obtain 5 $20 denomination of notes from the corresponding cassette 125 or cassettes 125 and provide to the upper transport module with media diverter 123. The media diverter 123 then diverts the 5 $20 notes to the note validator 122, from the note validator 122 back to the upper transport module 123 and to the dispenser/deposit module for the consumer to take. During a deposit, manager 113 instructs the dispenser/deposit module to transport the notes using the upper transport module 123 to the note validator module 122. The notes go from the upper transport module 123 to the note validator 122. The note validator module 122 passes the notes to the escrow module 121 while providing indications of reach note as to the conditions and denominations of the notes. The notes are held in the escrow module 121 where they sit until the user confirms they wish to proceed with the deposit. Assuming the user does wish to proceed with the deposit, the notes are transferred out of the escrow module 121, routed back through the note validator 122, then to the upper transport 123, to the lower transport 124, and into the corresponding cassettes 125.

It is noted that other modules of the recycler 120 may perform other operations on the notes during a deposit transaction, such other modules are not necessary for comprehending the teachings presented herein. Additionally, a variety of information and data are passed between the modules and manager 113 in performance of a given transaction which is not necessary for comprehending the teachings presented herein.

Media cassettes 125 include a specially designated cassette such as a cassette referred to as an "all-in" cassette 124. The all-in cassette 124 is used by the recycler 120 to store notes that are unfit for circulation because they are torn, dirty, ripped, or otherwise damaged. The all-in cassette 125 also stores genuine and fit notes that are of denominations for which there is no corresponding cassette 125, such as $2 notes, $50 notes, and/or $100 notes; this is determined by a bank's original configuration as to which genuine note denominations, if any, are stored in the all-in cassette 125. The notes stored in the all-in cassette 124 are not organized by denomination such that the all-in cassette 124 can store a plurality of different denominated notes; for example $1 notes, $2 notes, $5 notes, $10 notes, $20 notes, $50 notes, and/or $100 notes. Conversely, counterfeit detected notes are stored in a note reject bin.

Admin manager 114 includes an administrative interface through which service personnel can designate the cassettes 125 as being associated with specific note denominations and/or designated as the all-in cassette 125. During media service visits, the cassettes 125 are designated and a total number of notes per cassette 125 following the media service activity are noted through the administrative interface. This allows the admin manager 114 to keep counts per denomination that is present in each cassette 125 as the recycler 120 of terminal 110 is operated for note deposits and not withdrawals.

Admin manager 114 maintains the note counts per denomination, the denomination designated for each cassette 125, and a cassette identifier for the all-in cassette 125. Admin manager 114 provides these metrics and other metrics in real time to remote cassette optimizer 143 and/or 173. Admin manager 114 also provides the metrics in real time through the administrative interface. Such that at any given point in time an operator associated with a given terminal 110 can obtain cassette identifiers for each cassette 125, each cassette's known note capacity, each cassette's denomination of notes stored therein, a total number of notes currently stored in each cassette 125, and a cassette identifier for the all-in cassette 125.

With existing workflows of terminals and recyclers, a dispensed note from a cassette is not passed to an escrow module although the recycler is capable of performing this operation using the media diverter of the upper transport with media diverter module. This existing workflow is changed by the teachings presented herein to create a new and enhanced workflow that supports a cassette optimization function executed by cassette reconfiguration agent 115 on terminal 110, notes are temporarily stored in or on the escrow module 121 as notes are being redistributed between the cassettes 125.

Cassette reconfiguration agent 115 identifies a target cassette 125 either as a parameter based with the instruction to execute the cassette optimization function or based on current cassette-designated denominations, current note totals per cassette 125, and known note capacity per cassette 125. The denomination of notes in the target cassette 125 are used to identify another cassette 125 with the same note denomination which is capable of storing the total number of notes that are presently stored in the target cassette 125. Once the target cassette 125 and a destination cassette 125 are identified, the reconfiguration agent 115 issues extension for financial services (XFS) commands to the recycler 120 to cause the recycler 120 to move the notes from the target cassette 125 using the lower transport module 124 to the upper transport with media diverter module 123, from the upper transport module with media diverter module 123 into the note validator 122, from the note validator into escrow module 121, from the escrow module 121 back to the note validator 122, from the note validator 122 back to the upper transport module with media diverter module 123, from the upper transport module with media diverter module 123 to the lower transport module 124, and from the lower transport module 124 into the destination cassette 125. Cassette counters are update as the movement of the notes is processed to reflect where each note was moved and reflect the total denomination counts of each cassette 125 following a move. Once all the notes are transferred out of the target cassette 125, the cassette identifier for the target cassette 125 is updated to a denomination identifier provided as a processing parameter to the reconfiguration agent 115 when the cassette optimization function was initially invoked. The reconfiguration agent 115 reports out the counters, cassette denomination identifiers, and note metrics following successful completion of the cassette optimization function.

Figure 1B:
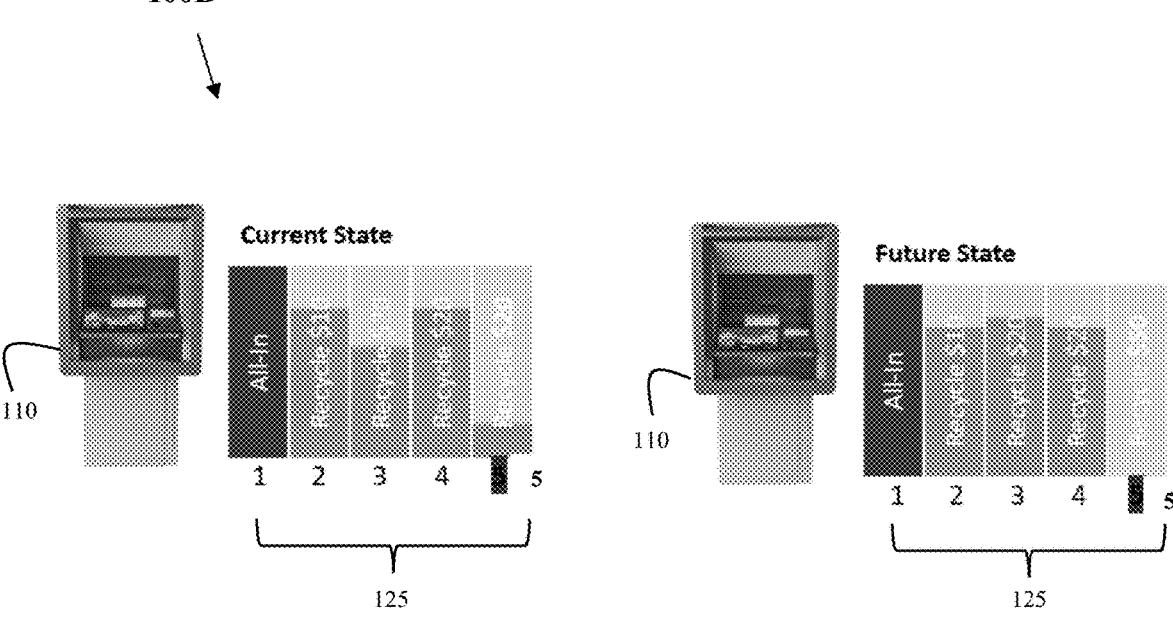
FIG. 1B is a diagram of graphic depicting currency denomination states of recycler cassettes in a terminal before and after terminal self-configuration of the cassettes, according to an example embodiment.

FIG. 1B is a diagram 100B of graphic depicting currency denomination states of recycler cassettes 125 in a terminal 110 before and after terminal self-configuration of the cassettes 125, according to an example embodiment. The lefthand side illustrates current note and denomination levels of 5 cassettes 125 for a terminal 110 as the current state. The righthand side illustrates the resulting future state for denomination levels and cassette denomination identifiers or labels, which is achieved following execution of the cassette optimization function by reconfiguration agent 115.

An operator issues a command to invoke and execute the reconfiguration agent 115 on terminal 110. The operator can issue the command from the administrative interface of admin manager 114 or form remote cassette optimizer 143 and/or 173. The command invocation includes a processing parameter that specifically states the operator wants to change the $20 denomination associated with cassette #5 to a $50 denomination.

Reconfiguration agent 115 inspects the current note metrics for each of the cassettes #1-#5 and discovers from the metrics that cassette #3 has a same $20 designation in the current state as does cassette #5. Agent 115 further determines that the total number of $20 notes for the current state of cassette #5 will fit into cassette #3 based on a known capacity of notes for cassette #3 and based on a current total of $20 notes stores in cassette #3 for the current state.

Next, agent 115 issues XFS commands to the recycler 120 to pick all of the $20 notes from cassette #5 run the notes through the note validator 122 and escrow module 121 to check fidelity of the notes being moved. Assuming the fidelity of the notes is verified, the XFS commands are issued to move the notes from the escrow module 121, to the note validator 122, to the upper transport module 123, to the lower transport module 124 and into cassette #3. All cassette counters are updated during the move of $20 notes from cassette #5 to cassette #3. Cassette #5 is relabeled or identified as a $50 denomination cassette 125 whose current $50 note counter is 0.

Agent 114 then logs the successful reconfiguration in an administrative log of terminal 110. The log incudes the metrics and designations for the original state for the cassettes (i.e., current state in FIG. 1B), metrics and designations for the now-existing state (i.e., future state in FIG. 1B), an operator identifier for the operator that initiated agent 115, a terminal identifier for terminal 110, a success or failure indication in executing the cassette optimization function, a current date, and a current time of day.

In an embodiment, the operator can be an automated script initiated by optimizer 143 and/or 173 based on currently reported cassette metrics reported by admin manager 114. That is, conditions of the cassettes 125 can be evaluated programmatically by a script and the script automatically initiates the invocation of agent 115 with the processing parameters needed.

In an embodiment, the automated script is executed on terminal 110 by admin manager 114. In this case, the terminal 110 itself determined when a redistribution of notes in the cassettes 125 is necessary and automatically invokes the agent 115 with the processing parameters needed.

In an embodiment, an engineer or manager access the administrative interface of admin manager 114 to inspect a current state of the cassettes 125. Based on the current state, the engineer or manager determines to select an option within the administrative interface to invoke agent 115 and supplies the desired processing parameters.

In an embodiment, support personnel identifies a current state of the cassettes 125 from report outs from or from an on-demand request made to the admin manager 114 through optimizer 143 and/or 173. The support personal selects an option to cause the admin manager 114 to invoke agent 115 with the desired processing parameters.

Figure 1C:
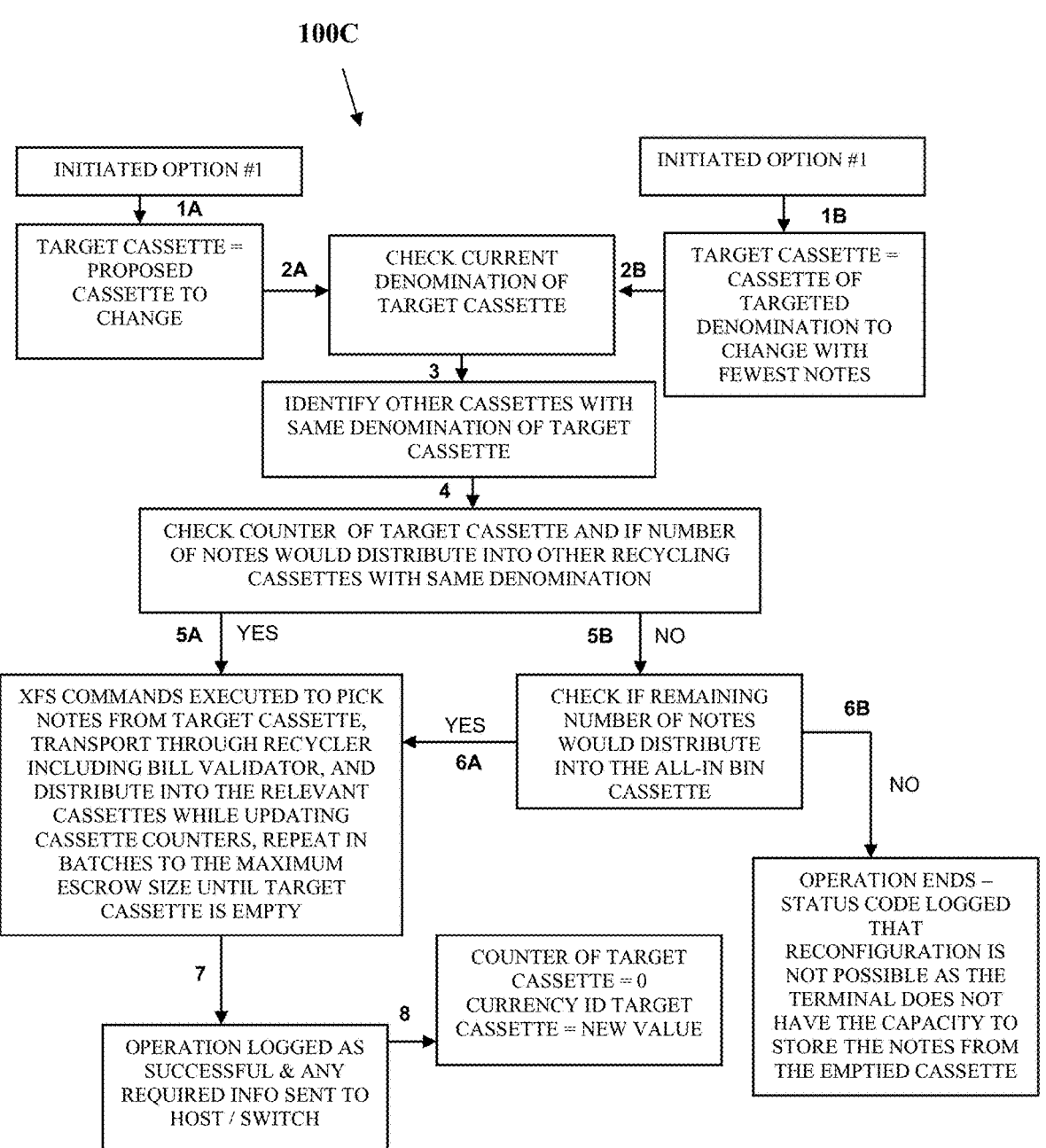
FIG. 1C is a flow diagram of a method for operations performed by the terminal on the recycler during self-configuration of the cassettes, according to an example embodiment.

FIG. 1C is a flow diagram of a method 100C for operations performed by the terminal 110 on the recycler 120 during self-configuration of the cassettes 125, according to an example embodiment. Method 100C represents the operations performed by agent 115 during a cassette optimization functions on terminal 110.

At 1A, an operator invokes agent 115 with processing parameter that identifies a target cassette to change its denomination of notes from a current denomination to a new proposed denomination. At 1B, an operator invokes agent 115 with a processing parameter parameter that identifies a denomination to change to a new denomination. At 1B, agent 115 identifies the target cassette 125 as a cassette that has the fewest current number of the new denomination; the operator does not provide a specific cassette 125 but rather a specific denomination and a new denomination desired for the cassettes 125 and agent 115 identifies the target cassette 125 for the new denomination.

At 2A and 2B, agent checks the current denomination of the target cassette 125. At 3, agent 115 identifies other cassettes 125 with the same denomination as is held current in the target cassette 125.

At 4, agent 115 checks counter totals for notes held in the target cassette 125 and determines whether that number of notes can be redistributed into other cassettes 125 with the same denomination. When the answer is no, at 5B, agent 115 checks if remaining number of notes can be distributed to the all-in cassette 125 of the recycler 120. When the answer is still no, at 6B, the agent 115 ends and the status is logged indication that reconfiguration is not possible as the terminal 120 does not have capacity to sore the notes in the target cassette 125 into other cassettes 125 of the terminal 110.

At 5B, agent 115 determines that the notes held in the target cassette 125 can be successfully stored in the all-in cassette 125. The destination cassette 125 is set to the all-in cassette 125. At 4, when agent 115 determines that the notes held in the target cassette 125 can be successfully stored in a second cassette 125 having a same denomination as the target cassette 125, the second cassette 125 is set to the destination cassette 125.

Assuming the destination cassette 125 is set, the agent 115 sends XFS commands to the recycler 120 to pick notes from the target cassette 125, transport the notes through the note validator 122 and escrow module 121, back from the escrow module 121 to the note validator 122, to the upper transport module 123, to the lower transport module 124, and distribute the notes into the destination cassette 125. Simultaneously as notes are moved, agent 115 updates cassette counters. Depending upon the size of the escrow module 121 and the total number of notes in the target cassette 125, agent 115 can repeat moving the notes in batches that are equal to the capacity of the escrow module 121. Agent 115 continues until the target cassette 125 is empty with a note total counter value of 0.

At 7, agent 115 logs data relevant to successfully executing the cassette optimization function. Agent 115 or admin manager 114 can also report the relevant information in real time through switch 130 to optimizer 143 and/or optimizer 173. At 8, the agent 115 sets a total note count for the target cassette to 0 and changes a current cassette identifier for the target cassette 125 to the processing parameter provided denomination value/identifier.

In an embodiment, agent 115 utilizes more than one destination cassette 125 when performing the note redistribution. For example, a cassette 125 of the same denomination as the target cassette and the all-in cassette are used as two destination cassettes 125 during the note transfer out of the target cassette. As another example, suppose that none of a plurality of cassettes 125 with the same denomination as the target cassette 125 have a current existing note capacity individually to receive all the notes from the target cassette

125. In this case, the notes from the target cassette 125 can be distributed equally or based on an algorithm, which utilizes the individual note capacities for each of the cassettes 125, into each of the plurality of destination cassettes 125 and/or the all-in cassette 125.

In an embodiment, the terminal 110 is an ATM. In an embodiment, the terminal 110 is a self-service terminal (SST) or a point-of-sale (POS) terminal that includes a recycler 120.

Figure 2:
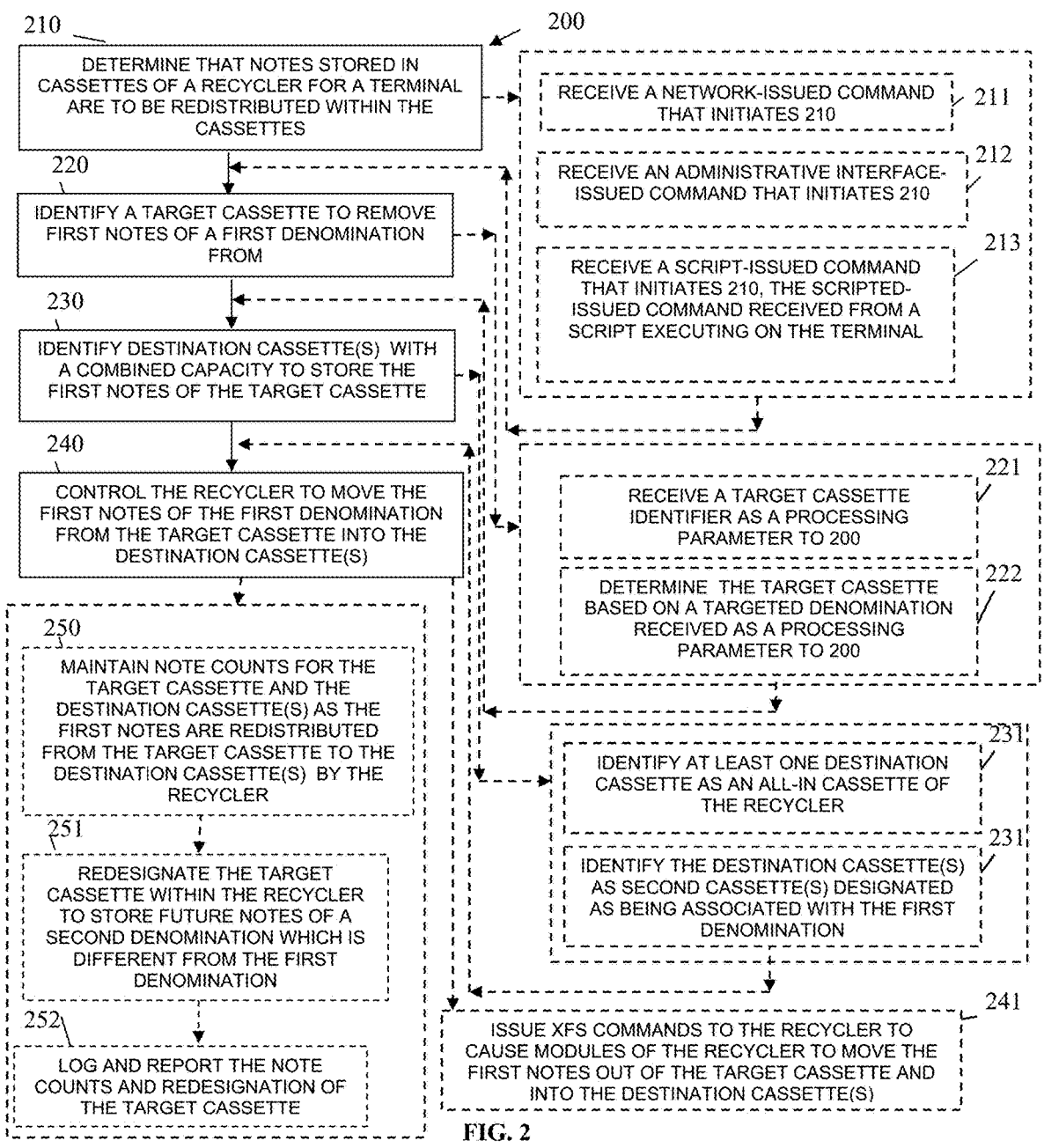
FIG. 2 is a flow diagram of a method for terminal self-configuration of media cassettes, according to an example embodiment.

The above-referenced embodiments and other embodiments will now be discussed with reference to FIG. 2. FIGS. is a flow diagram of a method 200 for terminal self-configuration of media cassettes, according to an example embodiment. The software module(s) that implements the method 200 is referred to as a "media cassette optimizer manager." The media cassette optimizer manager is implemented as executable instructions programmed and residing within memory and/or a non-transitory computer-readable (processor-readable) storage medium and executed by one or more processors of one or more devices. The processor(s) of the device(s) that executes the media cassette optimizer manager are specifically configured and programmed to process media cassette optimizer manager. The media cassette optimizer manager has access to one or more network connections during its processing. The connections can be wired, wireless, or a combination thereof.

In an embodiment, the device that executes the media cassette optimizer manager is terminal 110. In an embodiment, terminal 110 is an ATM, an SST, or a POS terminal. In an embodiment, the media cassette optimizer manager is executed on a combination of different devices 110, 140, and/or 150. In an embodiment, the media cassette optimizer manager is all of, or some combination of 113, 114, 115, 121-125, 143, and/or 173.

At 210, the media cassette optimizer manager determines that notes stored in cassettes 125 of a recycler 125 for a terminal 120 are to be redistributed within the cassettes 125. This determination can be made in a variety of manners.

In an embodiment, at 211, the media cassette optimizer manager receives a network-issued command that initiates 210. In an embodiment, at 212, the media cassette optimizer manager receives an administrative interface-issued command that initiates 210. In an embodiment, at 213, the media cassette optimizer manager receives a scripted-issued command that initiates 210. The scripted-issued command received from a script that is executing on the terminal 120.

At 220, the media cassette optimizer manager identifies a target cassette 125 to remove first notes of a first denomination from. This also can be achieved in a variety of manners.

In an embodiment, at 221, the media cassette optimizer manager receives a target cassette identifier as a processing parameter to media cassette optimizer manager. In an embodiment, at 222, the media cassette optimizer manager determines the target cassette 125 based on a targeted denomination received as a processing parameter to the media cassette optimizer manager.

At 230, the media cassette optimizer manager identifies a destination cassette 125 with a capacity to store the first notes of the target cassette 125. The destination cassette 125 can be identified in a variety of manners.

In an embodiment, at 231, the media cassette optimizer manager identifies one or more destination cassettes 125 as an all-in cassette 125 of the recycler 120. In an embodiment, at 232, the media cassette optimizer manager identifies the destination cassette 125 as second cassette 125 designated as being associated with the first denomination.

At 240, the media cassette optimizer manager controls the recycler 120 to move the first notes of the first denomination from the target cassette 125 into the destination cassette 125. In an embodiment, at 241, the media cassette optimizer manager issues XFS commands to cause models 121-125 to move the first notes out of the target cassette 125 and into the destination cassette 125.

In an embodiment, at 250, the media cassette optimizer manager maintains note counts for the target cassette 125 and the destination cassette 125 as the first notes are redistributed from the target cassette 125 to the destination cassette 125 by the recycler 120. In an embodiment of 250 and at 251, the media cassette optimizer manager redesignates the target cassette 125 within the recycler 120 to store future notes of a second denomination different from the first denomination. In an embodiment of 251 and at 252, the media cassette optimizer manager logs and reports the note counts and the redesignation of the target cassette 125 to be associated with the second denomination.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

determining, by a terminal, that notes stored in cassettes of a recycler for the terminal are to be redistributed within the cassettes;

identifying, by the terminal, a target cassette to remove first notes of a first denomination from;

identifying, by the terminal, one or more destination cassettes with a combined capacity to store the first notes of the target cassette;

operating, by the terminal, an escrow module and a note validator module of the recycler to transport the first notes of the first denomination out of the target cassette, through the note validator module, into the escrow module, back through the note validator module, and into the one or more destination cassettes; and controlling, by the terminal, the recycler to move the first notes of the first denomination from the target cassette into the one or more destination cassettes by issuing extension for financial services (XFS) commands to the recycler that cause a lower transport module, an upper transport with media diverter module, the note validator module, and the escrow module of the recycler to physically move the first notes from the target cassette to the one or more destination cassettes while updating cassette counters for the target cassette and the one or more destination cassettes during the movement of the first notes.

2. The method of claim 1 further comprising, maintaining, by the terminal, note counts for the target cassette and the one or more destination cassettes as the first notes are redistributed from the target cassette to the one or more destination cassettes by the recycler.

3. The method of claim 2 further comprising, by the terminal, redesignating the target cassette within the recycler to store future notes of a second denomination which is different from the first denomination.

4. The method of claim 3 further comprising, logging and reporting, by the terminal, the note counts and the redesignation of the target cassette to the second denomination.

5. The method of claim 1, wherein determining further includes receiving a network-issued command that initiates the determining.

6. The method of claim 1, wherein determining further includes receiving an administrative interface-issued command that initiates the determining.

7. The method of claim 1, wherein determining further includes receiving a script-issued command that initiates the determining, wherein the scripted-issued command received from a script executing on the terminal.

8. The method of claim 1, wherein identifying the target cassette further includes receiving a target cassette identifier as a processing parameter to the method.

9. The method of claim 1, wherein identifying the target cassette further includes determining the target cassette based on a targeted denomination received as a processing parameter to the method.

10. The method of claim 1, wherein identifying the destination cassette further includes identifying the destination cassette as an all-in cassette of the recycler.

11. The method of claim 1, wherein identifying the destination cassette further includes identifying the destination cassette as a second cassette designated as being associated with the first denomination.

12. The method of claim 1, wherein controlling further includes issuing extensible financial services (XFS) commands to the recycler to cause modules of the recycler to move the first notes out of the target cassette and into the one or more destination cassettes.

13. A terminal (SST), comprising:

a processor;

a non-transitory computer readable storage medium comprising executable instructions;

a recycler comprising:

an escrow module;

a note validator module;

an upper transport with diverter module; and a lower transport module comprising media cassettes; and the executable instructions when executed by the processor cause the processor to perform operations comprising:

receiving a cassette optimization request and a parameter that identifies a target cassette or identifies a target denomination;

determining the target cassette when the parameter identifies the target denomination as a particular cassette of the targeted denomination that has the fewest number of notes when compared to other cassettes associated with the target denomination;

identifying one or more destination cassettes from current note capacities of the media cassettes and a total number of first notes currently stored in the target cassette; and issuing commands to the recycler to operate the escrow module, the note validator module, the upper transport with media diverter module, and the lower transport module by issuing extension for financial services (XFS) commands that cause the lower transport module to pick the first notes from the target cassette, transport the first notes through the note validator module and into the escrow module, and then transport the first notes from the escrow module back through the note validator module and through the upper transport with media diverter module and the lower transport module into the one or more destination cassettes, and cause the first notes of the target cassette to move out of the target cassette and into the one or more destination cassettes while the processor updates cassette counters reflecting a denomination count for the target cassette and the one or more destination cassettes as the first notes are moved.

14. The terminal of claim 13, wherein the terminal is an automated teller machine, a self-service terminal, or a point-of-sale terminal.

15. The terminal of claim 13, the executable instructions when executed by the processor further cause the processor to perform additional operations comprising:

maintaining note counts for the first notes moved from the target cassette and into the one or more destination cassettes; and logging and reporting the note counts once the first notes are moved out of the target cassette and into the one or more destination cassettes.

16. The terminal of claim 13, the executable instructions when executed by the processor further cause the processor to perform additional operations comprising:

setting a designation for the target cassette within the recycler to be associated with the target denomination or a particular denomination provided as a second parameter to the cassette optimization request.

17. The terminal of claim 13, wherein the operations associated with the issuing further includes issuing the commands as extensible financial services (XFS) commands to the recycler.

18. The terminal of claim 13, wherein the operations associated with identifying the one or more destination cassettes further includes identifying the at least one of the destination cassettes as an all-in cassette when remaining cassettes of the target denomination lack the corresponding current note capacities to store the first notes and when the all-in cassette has the corresponding note current capacity to store the first notes.

19. A system, comprising:

a cloud server comprising a cloud processor, a terminal (SST) comprising a terminal processor and a recycler;

the cloud processor configured to execute instructions that cause the cloud processor to perform first operations comprising:

receiving current cassette note metrics for cassettes of the recycler from the terminal;

determining to issue a cassette optimization function on the terminal based on the current cassette note metrics; and issuing the cassette optimization function request to the terminal; and the terminal processor configured to execute instructions that cause the terminal processor to perform second operations comprising;

receiving the cassette optimization function request from the cloud;

identifying a target cassette based on the cassette optimization function request;

identifying a first denomination of first notes stored in the target cassette;

identifying a first total number of first notes stored in the target cassette;

identifying one or more destination cassettes with a combined note capacity to store the first noted currently stored in the target cassette;

issuing extension for financial services (XFS) commands to the recycler to cause a lower transport module, an upper transport with media diverter module, a note validator module, and an escrow module of the recycler to physically move the first notes from the target cassette through the note validator module, into the escrow module, back through the note validator module, and into the one or more destination cassettes;

controlling the recycler to move the first notes out of the target cassette and to store the first notes in the one or more destination cassettes;

notifying the recycler that the target cassette is to be associated with a new denomination of notes; and reporting new note metrics for the cassettes to the cloud based on the controlling and the notifying.

20. The system of claim 19, wherein the terminal is an automated teller machine, a self-service terminal, or a point-of-sale terminal.

* * * * *